United States Patent [19]

Kaminski et al.

[11] 4,152,602

[45] May 1, 1979

[54] NUCLEAR FUEL RACK LATERAL RESTRAINT

[75] Inventors: Donald J. Kaminski, Trafford; Charles H. Boyd, Plum Borough, both of Pa.

[73] Assignee: Westinghouse Electric Corp., Pittsburgh, Pa.

[21] Appl. No.: 779,121

[22] Filed: Mar. 18, 1977

[51] Int. Cl.² .............................................. G21F 5/00
[52] U.S. Cl. ..................................... 250/507; 176/87; 176/76
[58] Field of Search .................. 250/506, 507; 176/30, 176/76, 85, 87

[56] References Cited

U.S. PATENT DOCUMENTS

| | | | |
|---|---|---|---|
| 3,206,374 | 9/1965 | Lemesle et al. | 176/85 |
| 3,248,299 | 4/1966 | Junkermann et al. | 176/85 |
| 3,720,581 | 3/1973 | Kaser | 176/87 |
| 3,853,703 | 12/1974 | Anthony et al. | 176/87 |
| 3,987,860 | 10/1976 | Jabsen | 176/87 |

*Primary Examiner*—Bruce C. Anderson
*Attorney, Agent, or Firm*—Edward L. Levine; Z. L. Dermer

[57] ABSTRACT

A lateral restraint device for nuclear fuel racks which can accommodate differential thermal expansion between the racks and a containing enclosure. The restraint includes a piston, movable within a cylinder, joined to one or more support pads which contact the wall of the enclosure. A spring is also provided within the cylinder to act upon the piston. The piston is sized to provide a predetermined clearance or opening allowing controlled liquid flow into the cylinder. The piston can be held in a given position within the cylinder with the spring compressed to facilitate installation onto the side of a fuel rack, and subsequently positioned by the expanded spring. Relatively small differential expansion loads are accommodated by the moving piston and spring, while large loads, such as those imposed by a seismic occurrence, are resisted by the hydraulic fluid within the cylinder.

5 Claims, 4 Drawing Figures

NUCLEAR FUEL RACK LATERAL RESTRAINT

BACKGROUND OF THE INVENTION

1. Field of the Invention

This invention relates to restraint devices and more particularly provides a flexible lateral restraint device for an underwater nuclear fuel storage rack.

2. Description of the Prior Art

Nuclear power generating plants are typically fueled by elongated fuel assemblies, such as those including a bundle of nuclear fuel rods. Subsequent to utilization of the fuel assemblies in a nuclear core they are stored within fuel racks positioned within an enclosure such as a spent fuel pit.

A typical spent fuel pit or pool includes leak tight vertical walls and a floor made of concrete and other support materials lined with stainless steel. The fuel racks include a rectangular, closely spaced array of cells, each cell sized to receive a fuel assembly. Because the assemblies have been irradiated they must be shielded, and water is typically utilized for this purpose. The assemblies and fuel racks are therefore maintained submerged within water within the pit.

It is of significant importance that the fuel racks be restrained laterally within the fuel pit under accident conditions, such as a large seismic occurrence. Excessive deflections of the racks and contained fuel assemblies could result in damage to the assemblies and the surrounding environs. It is also recognized that differential thermal expansions can occur in time between the fuel racks and the walls of the containing fuel pit.

Accordingly, several types of lateral restraint devices have been proposed in the past, which respond to these differential expansions as well as seismic occurrences. One type has been proposed which is affixed to the side of the fuel rack and positions, through an arc-like motion between the fuel rack and the containing wall, a load pad surface against the fuel pit wall. A pre-load is imposed upon the pads by a series of Belleville-type springs between a portion of the restraining device and the load pads. With such arc-type devices the pre-load is very difficult to adjust and the device is difficult to properly and accurately position. An excessive amount of space between the fuel rack and the pit wall is also required to accommodate the arc-like motion. Further, the arc motion devices are difficult to properly seat against the pit wall due to the high frictional forces and slippage among the contact pad surface and the pit wall.

A significant improvement upon the arc motion device utilizes the substantially horizontal motion of a device affixed to the side of the rack and remotely extendible into contact with the pit wall. It operates in a manner similar to a scissors jack. This device is described in detail in application Ser. No. 789,912, filed Apr. 22, 1977, in the name of June S. Knight, Personal representative of the estate of Charles B. Knight, deceased, and entitled "Nuclear Fuel Rack Lateral Support and Pre-Load Device".

Among the prior art, the arc-motion devices imposed loads between the racks and walls resulting from differential expansions, as well as imposing loads for pre-load purposes. Thus, the pit walls, for example, are loaded needlessly high. The pre-loaded scissors jack device suffers the same deficiency.

Although these prior art devices will perform the intended function, it is desirable to have an alternative and simple lateral support which avoids unnecessarily high loadings, particularly in new plant installations where remote positioning capability is not necessarily required.

SUMMARY OF THE INVENTION

This invention provides a lateral support for nuclear fuel racks positioned underwater which provides the capability of a substantially rigid support in the event of large accidental loadings, while also providing the capability to inherently absorb differential thermal expansions between a fuel rack and the adjacent enclosing wall. The device can be manufactured simply, and can be sized to require a small amount of space. The device includes, similar to prior art systems, one or more load pads with a flat surface that can be positioned into contact with a vertical surface such as the wall of a spent fuel pit. The structure utilized for extending and positioning the pads, however, is significantly different and more simple than prior art structures and can eliminate the use of Belleville-type springs in a preferred embodiment. The pads are joined directly or preferably through a leveling foot to a sliding piston. The piston is disposed partially or completely within a horizontally oriented cylinder affixed to the side of the spent fuel rack. At the opposite end of the piston, an elastic structure such as a compression spring is positioned so as to continuously apply a positioning force to the piston.

The device also includes structure for maintaining the piston in a fixed position within the cylinder with the spring in a significant compressed orientation. This structure can include a simple pin inserted through an opening in the wall of the cylinder matingly engaged with a receiving aperture in the piston. Means are also provided for controlling the amount of fluid, such as the water in which the assemblies and racks are immersed, which can flow into or out of the cylinder portion behind the piston in a predetermined fashion. This can be accomplished by contouring the piston to the shape of the cylinder, with a preselected clearance between the two components, or by incorporating selectively sized flow relief openings.

The properly sized lateral support device can therefore be installed onto a fuel rack with the spring compressed and the piston maintained in place by the retaining pin. Subsequently, the holding pin is removed, allowing the spring to laterally move the piston and affixed surface so that the surface contacts the pit wall. Differential thermal expansions between the pit wall and the side of the fuel rack will then be accommodated by movement of the piston and the respective expansion or contraction of the compression spring. The water in the pit will also flow into the area behind the piston within the cylinder containing the compression spring. Under a large lateral loading, such as a seismic accident condition, the substantially incompressible fluid within the cylinder will resist and damp the motion of the piston, thereby providing a substantially rigid restraint between the fuel rack and the wall so as to alleviate the potential for excessive loading or bending forces upon the contained fuel assemblies.

In view of the prior art, it is readily apparent that forces imposed between the fuel racks and pit walls from differential thermal expansion are avoided by water bleeding out of the cylinder. However, for a seismic event the substantially incompressible liquid will act as a rigid restraint.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENTS

Figure 1:
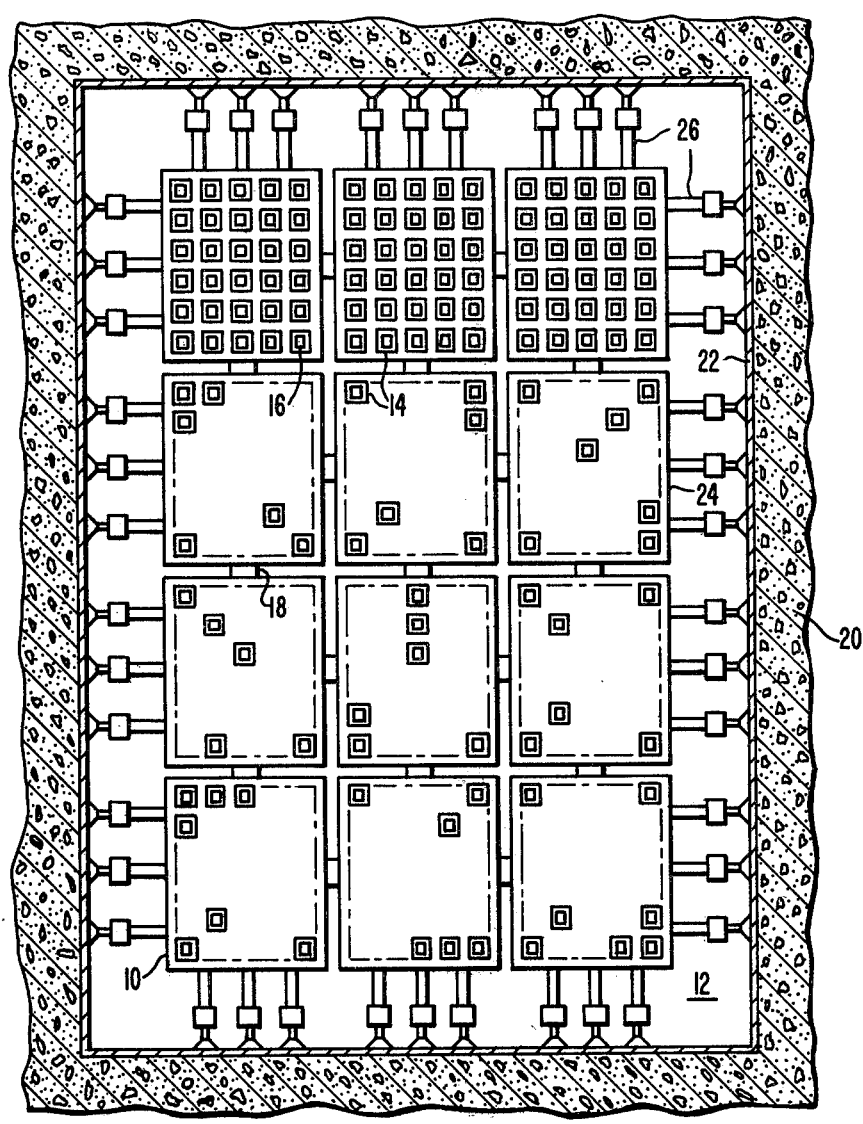
FIG. 1 is a schematic plan view of a plurality of fuel racks positioned within a spent fuel pit.

Referring now to FIG. 1 there is shown a plurality of nuclear fuel racks 10 positioned within a spent fuel storage pit 12. The racks are arranged within the pit or pool in a rectangular array, and each rack includes a plurality of cells 14 sized to receive a fuel assembly 16. Adjacent racks 10 are joined by lateral supports 18 so as to form a structure which moves essentially as a single mass under high loading conditions. The racks are also typically affixed to the bottom of the spent fuel pit by a bolted or welded structure (not shown). The spent fuel pit typically includes a concrete or other structural support 20 with a metallic sealed lining 22. The racks have sides 24, typically comprised of a plurality of metallic beams affixed in an open fashion to allow the flow of borated water therethrough. Between the sides 24 and the substantially parallel lining 22 are positioned a plurality of lateral support and restraint devices 26. The devices can be positioned at varying elevations along the sides of the fuel racks, although preferably positioned near the top of the racks.

Figure 3:
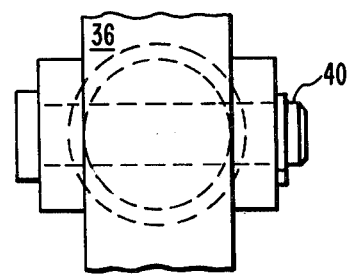
FIG. 3 is a view taken at III—III of FIG. 2.
Figure 2:
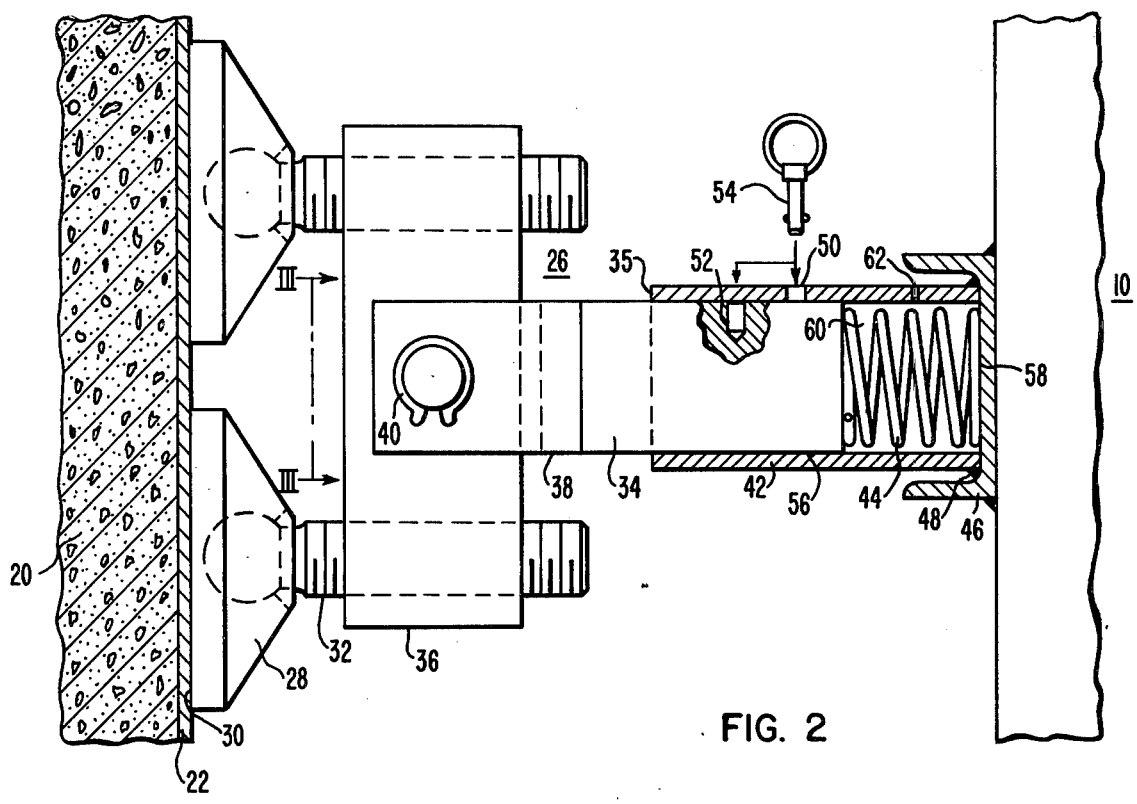
FIG. 2 is an elevation view, in section, of an embodiment of a lateral restraint device in accordance with this invention.

One embodiment of a lateral support and restraint device in accordance with this invention is shown in FIGS. 2 and 3. It includes one or more preferably ball jointed swivel pads 28 having a flat surface 30 that will seat against any surface substantially perpendicular to the axis of the arms 32 to which the pads 28 are affixed. The arms 32 can be affixed directly to a piston 34 or joined thereto by additional components as shown. The additional components can include a leveling foot 36 affixed to a piston extension 38 by a pinned connection 40.

Figure 4:
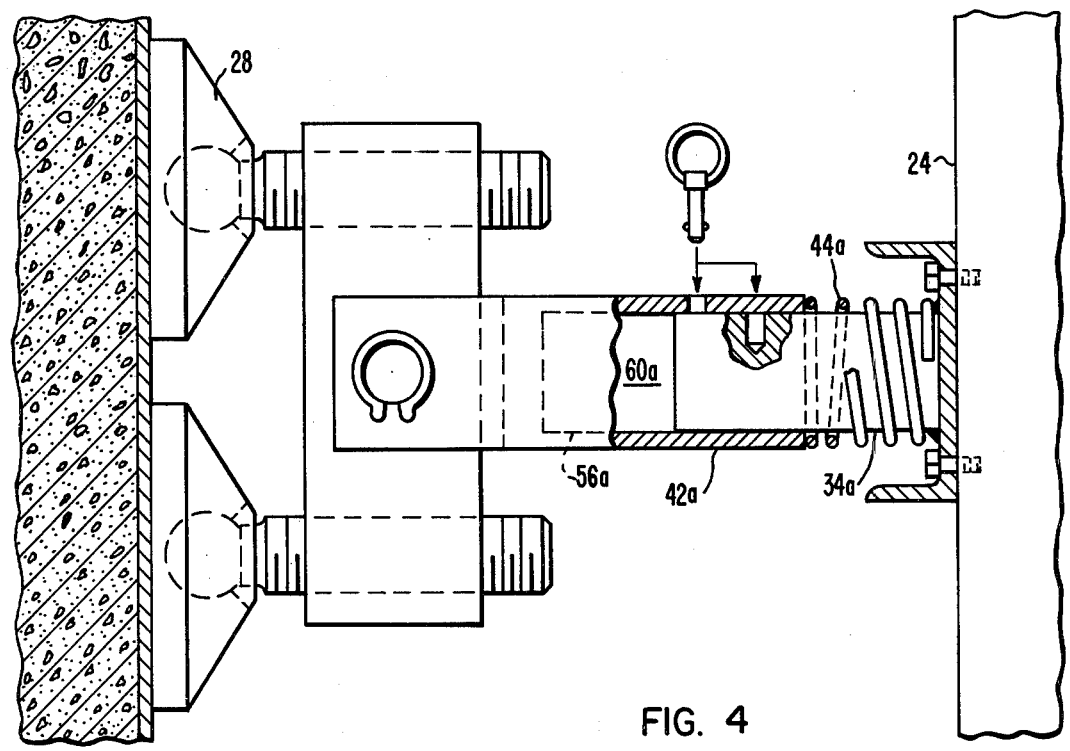
FIG. 4 is an elevation view of another embodiment device in accordance with this invention.

The piston 34 is slidably disposed within a cylinder 42 for reciprocating motion therein, and preferably extends through an open end 35 of the cylinder. Between the piston and the fuel rack, preferably contained within the cylinder, is an elastic compressible member such as the compression spring 44. The spring 44 is specifically sized to continuously apply a positioning force to the piston. Means are also provided for affixing the cylinder 42 to the fuel rack 10, such as the cylinder being welded to the rack support 46 by welds 48. Alternatively, as shown in FIG. 4, the pads 28 can be joined to the cylinder 42a which slides, through a predetermined clearance 56a, on stationary piston 34a. Piston 34a is affixed to the side 24 of the fuel rack, and spring 44a continuously acts upon cylinder 42a. Referring again to FIGS. 2 and 3, structure is also provided for selectively restraining the piston 34 in a retained position while the spring is compressed. This can include the opening 50 in the wall of the cylinder, a mating aperture 52 partially through the piston, and a ringed pin 54 insertable through the opening 50 into the aperture 52 upon alignment of the opening and aperture. The opening 50 is preferably positioned so that a portion of the piston is always aligned with the opening, thereby preventing undesirable flow paths into or out of the cylinder.

Means are also provided for controlling the flow of fluid into or out of the portion of the cylinder between the piston and the fuel rack. This can include a preselected clearance 56 between the piston 34 and cylinder 42 or alternatively, one or more small openings through the cylinder wall or the end 58 adjacent the spring 44.

As will be readily apparent, the device 26 can be easily installed. The piston can be loaded into the cylinder so as to compress the spring and locked into position by the ringed pin. The cylinder can then be affixed to the fuel rack side. The leveling foot and affixed components can than be attached to the piston or its extension, readying the device for final positioning. With properly sized components, the device can then be positioned merely by removing the ringed pin, allowing the spring to act on the piston, thereby forcing the piston laterally out of the cylinder and the joined pads against the spent fuel pool wall. The water in the pit flows, in a controlled fashion, into the area 60 within the cylinder and about the spring. For non-rapid relative motions, such as those brought about by differential thermal expansion between the pit wall and the rack, the piston will slide in the appropriate direction within the cylinder restrained or assisted as the case may be by the compression spring for rapid relative movements, such as seismic loading conditions, however, the hydraulic fluid within the cylinder cannot be rapidly discharged, and the support will accordingly react as a substantially rigid restraint or damper of the loading. The magnitude of the restraining force can be adjusted to any desired level by incorporating variously sized piston to cylinder clearances and/or variously sized and oriented flow relief openings 62. The device shown in FIG. 4 will operate similarly.

It will be apparent that many modifications and additions are possible in view of the above teachings. It therefore is to be understood that within the scope of the appended claims, the invention can be practiced other than as specifically described.

What is claimed is:

1. A nuclear fuel rack disposed within an enclosure having substantially vertical walls, said rack including a plurality of cells each sized to receive a nuclear fuel assembly, said rack positioned so as to have a side substantially parallel to and spaced from one of said walls, said rack additionally having a seismic restraint comprising:
   a. a cylinder;
   b. a piston cooperatively associated with said cylinder for sliding motion with respect thereto;
   c. means for allowing a controlled flow of fluid into said cylinder so as to restrain motion of said piston;
   d. a support surface joined to one of said piston and cylinder and positionable substantially perpendicular thereto;
   e. means for affixing the other of said piston and cylinder to said rack in a substantially horizontal orientation; and
   f. an elastic structure substantially stationary at one end with respect to said rack and acting at the other end upon the one of said piston and cylinder joined to said surface.

2. The nuclear fuel rack of claim 1 additionally comprising means for selectively retaining said piston fixed with respect to said cylinder.

3. The nuclear fuel rack of claim 2 wherein said cylinder includes a wall having an opening therethrough, said piston includes an aperture alignable with said opening, and said selective retaining means comprise a pin removably insertable into said aligned opening and aperture.

4. The nuclear fuel rack of claim 1 wherein said fluid flow controlling means comprise a preselected clearnance between said piston and cylinder.

5. A lateral restraint for a nuclear fuel rack having a plurality of cells each sized to receive a nuclear fuel assembly disposed within a walled fuel storage pit, said restraint affixed to said rack so as to extend laterally therefrom and comprising:
   a. a cylinder;
   b. a piston cooperatively associated with said cylinder for sliding motion with respect thereto;
   c. means for allowing a controlled flow of fluid into said cylinder so as to restrain motion of said piston;
   d. a support pad joined to one of said piston and cylinder and positionable so as to contact said wall;
   e. means for affixing the other of said piston and cylinder to said rack in a substantially horizontal orientation; and
   f. an elastic structure cooperatively associated with the one of said piston and cylinder joined to said pad so as to continuously apply a lateral positioning force thereto.

* * * * *

Disclaimer 4,152,602.—*Donald J. Kaminski*, Trafford, and *Charles H. Boyd*, Plum Borough, Pa. NUCLEAR FUEL RACK LATERAL RESTRAINT. Patent dated May 1, 1979. Disclaimer filed July 2, 1979, by the assignee, *Westinghouse Electric Corporation*.

Hereby enters this disclaimer to claims 1 and 5 of said patent.

[*Official Gazette September 4, 1979.*]